(12) United States Patent
Iwasaki et al.

(10) Patent No.: US 8,703,866 B2
(45) Date of Patent: Apr. 22, 2014

(54) ROOM TEMPERATURE CURABLE ORGANOPOLYSILOXANE COMPOSITION

(75) Inventors: Isao Iwasaki, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 365 days.

(21) Appl. No.: 12/619,842

(22) Filed: Nov. 17, 2009

(65) Prior Publication Data

US 2010/0130658 A1 May 27, 2010

(30) Foreign Application Priority Data

Nov. 26, 2008 (JP) ................................ 2008-300705

(51) Int. Cl.
- *C08L 83/04* (2006.01)
- *C08K 5/11* (2006.01)
- *C08G 77/14* (2006.01)
- *C08K 3/26* (2006.01)

(52) U.S. Cl.
USPC ........... 524/860; 524/312; 524/313; 524/425; 528/17; 528/42; 528/901

(58) Field of Classification Search
USPC .............. 524/860, 312, 313, 425; 528/17, 42, 528/901
See application file for complete search history.

(56) References Cited

U.S. PATENT DOCUMENTS

| | | | | |
|---|---|---|---|---|
| 4,675,356 A | * | 6/1987 | Miyata | 524/424 |
| 5,440,002 A | * | 8/1995 | Kimura et al. | 528/17 |
| 5,776,308 A | * | 7/1998 | Sears et al. | 162/158 |
| 6,166,121 A | * | 12/2000 | Nishiumi et al. | 524/425 |
| 6,433,089 B1 | * | 8/2002 | Nishihara et al. | 525/191 |
| 7,060,351 B2 | * | 6/2006 | Hannington | 428/343 |
| 2007/0148433 A1 | * | 6/2007 | Mallory et al. | 428/304.4 |
| 2007/0219297 A1 | * | 9/2007 | Nishiumi et al. | 524/82 |

FOREIGN PATENT DOCUMENTS

| | | |
|---|---|---|
| JP | 39-27643 | 12/1939 |
| JP | 55-43119 | 11/1980 |
| JP | 2-38309 | 8/1990 |
| JP | 7-39547 | 5/1995 |
| JP | 2003-176411 | 6/2003 |

* cited by examiner

*Primary Examiner* — Tae H Yoon
(74) *Attorney, Agent, or Firm* — Oblon, Spivak, McClelland, Maier & Neustadt, L.L.P.

(57) ABSTRACT

A room temperature curable organopolysiloxane composition comprising (A) a diorganopolysiloxane, (B) an alkoxysilane compound and/or a partial hydrolytic condensate thereof, (C) a curing catalyst, and (D) an organic compound having at least one fatty acid ester radical —OC(=O)CH$_2$R$^3$ (wherein R$^3$ is H or a monovalent hydrocarbon radical) and 0, 1 or 2 hydroxyl radicals effectively cures to glass and fluoropolymer-coated aluminum without a need for primer and has storage stability in a sealed package.

18 Claims, No Drawings

ROOM TEMPERATURE CURABLE ORGANOPOLYSILOXANE COMPOSITION

CROSS-REFERENCE TO RELATED APPLICATION

This non-provisional application claims priority under 35 U.S.C. §119(a) on Patent Application No. 2008-300705 filed in Japan on Nov. 26, 2008, the entire contents of which are hereby incorporated by reference.

TECHNICAL FIELD

This invention relates to an organopolysiloxane composition which cures at room temperature into silicone rubber. More particularly, it relates to a room temperature curable organopolysiloxane composition which cures into silicone rubber having improved self-adhesion to glass, coated aluminum or the like, and has storage stability in a hermetically sealed package.

BACKGROUND ART

Conventional organopolysiloxane compositions which cure at room temperature (RT) into rubber-like elastomers include one-pack RT curable organopolysiloxane compositions in which cure reaction takes place upon contact with airborne moisture. The one-pack organopolysiloxane compositions are widely used as elastomeric adhesives and coating materials in the electrical and electronic industry, building sealants, and the like because these compositions dispense with cumbersome steps of weighing and mixing base polymer, crosslinker and catalyst immediately before use, and are thus devoid of any compounding errors. In addition, they generally have excellent adhesion to a wide variety of substrates even in the absence of primers. The one-pack RT curable organopolysiloxane compositions are often classified in terms of the compound which is released from the composition upon contact with airborne moisture, typically into deacetic acid, deoximation, deamidation, dehydroxylamination, deacetonation and dealcoholization types. Of these, organopolysiloxane compositions of the dealcoholization type, which cure while releasing alcohol, are preferred because they give off less odors, and are non-corrosive to metals such as cupper and iron, and good in self-adhesion (as-cured adhesion to various substrates in the absence of primers) and durable adhesion.

One-pack organopolysiloxane compositions of the dealcoholization type display excellent properties as described above for a brief time after preparation, but has the drawback of storage instability. For example, some compositions lose their initial properties with the lapse of time during storage. After storage in a high temperature environment in excess of 50° C., as often found during field storage under direct sunlight or storage in containers during transport, even for a relatively short period of time, there arise problems like failure to maintain the initial properties and under-cure.

One-pack organopolysiloxane compositions of the dealcoholization type are known from the past. For example, JP-B S39-27643 discloses a composition comprising a hydroxyl end-blocked organopolysiloxane, alkoxysilane, and titanium compound. JP-A S55-43119 discloses a composition comprising an alkoxysiloxy end-blocked organopolysiloxane, alkoxysilane, and alkoxytitanium. However, these compositions have problems that they become storage unstable when calcium carbonate is compounded for imparting good physical properties as sealants; they fail to display the desired properties after long-term storage; and they lose curability after storage in a high temperature environment above 50° C. JP-B H07-39547 proposes a composition having storage stability in a hermetically sealed package. Since the composition proposed essentially comprises an organopolysiloxane polymer terminally modified with an alkoxysilylalkylene radical, the preparation of the polymer adds to the industrial cost. Recently, JP-A H02-38309 and JP-A 2003-176411 disclose compositions using fatty acid ester-treated calcium carbonate, which are insufficient in storage stability at high temperature above 50° C. In addition, since the fatty acid ester-treated calcium carbonate is a special filler, compositions with heavy loadings of the filler become expensive.

CITATION LIST

Patent document 1: JP-B S39-27643
Patent document 2: JP-A S55-43119
Patent document 3: JP-B H07-39547
Patent document 4: JP-A H02-38309
Patent document 5: JP-A 2003-176411

SUMMARY OF INVENTION

An object of the invention is to provide at a low cost an organopolysiloxane composition which cures into a cured product or silicone rubber that is fully adherent to glass, coated aluminum and the like in the absence of a primer, and which has improved storage stability in a hermetically sealed package, even in a high temperature environment.

The invention provides a room temperature curable organopolysiloxane composition comprising:

(A) 100 parts by weight of a diorganopolysiloxane blocked with hydroxylsilyl, alkoxysilyl or alkoxyalkoxysilyl radicals at both ends of the molecular chain and represented by the general formula (1), the diorganopolysiloxane having a viscosity of 20 to 1,000,000 mPa-s at 25° C.,

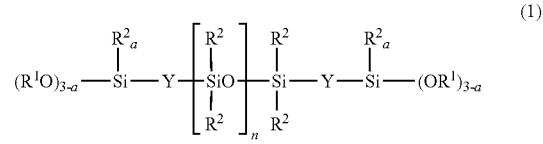

wherein $R^1$ is hydrogen, an alkyl radical of 1 to 10 carbon atoms or alkoxyalkyl radical of 2 to 10 carbon atoms, $R^2$ is a radical of 1 to 10 carbon atoms selected from the group consisting of monovalent hydrocarbon, monovalent halogenated hydrocarbon and cyanoalkyl radicals, a is 2 when $R^1$ is hydrogen, a is 0 or 1 when $R^1$ is an alkyl or alkoxyalkyl radical, Y is oxygen, a divalent hydrocarbon radical of 1 to 6 carbon atoms or a radial of the general formula (2):

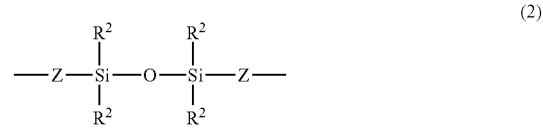

wherein $R^2$ is as defined above, and Z is a divalent hydrocarbon radical of 1 to 6 carbon atoms, and n is such a number that the diorganopolysiloxane may have a viscosity of 20 to 1,000,000 mPa-s at 25° C., (B) 0.5 to 20 parts by weight of an alkoxysilane compound and/or a partial hydrolytic condensate thereof, (C) 0.001 to 20 parts by weight of a curing catalyst, and (D) 0.1 to 5 parts by weight of an organic compound having in the molecule a number α of fatty acid ester radical of the general formula (3):

$$-OC(=O)CH_2R^3 \qquad (3)$$

wherein $R^3$ is hydrogen or a monovalent saturated or unsaturated hydrocarbon radical which may be straight or branched, and a number β of hydroxyl radical wherein α is a positive integer of at least 1, β is 0, 1 or 2, and α+β≥3.

Typically component (C) is a titanium compound.

Component (D) is preferably a fatty acid ester of a polyol containing at least 3 hydroxyl radicals in the molecule, having a fatty acid ester radical of formula (3), and more preferably a fatty acid glycerol ester having a fatty acid ester of formula (3). It is typically selected from among triacetin, diacetin, monoacetin, and mixtures thereof.

The composition may further comprise (E) 10 to 300 parts by weight of calcium carbonate and/or (F) 0.1 to 20 parts by weight of a silane coupling agent.

ADVANTAGEOUS EFFECTS OF INVENTION

The room temperature curable organopolysiloxane composition cures into a cured product which is fully adherent to glass, coated aluminum and the like in the absence of a primer, and has improved storage stability in a hermetically sealed package.

DESCRIPTION OF EMBODIMENTS

The singular forms "a," "an" and "the" include plural referents unless the context clearly dictates otherwise.

Briefly stated, the room temperature curable organopolysiloxane composition comprises (A) a hydroxylsilyl, alkoxysilyl or alkoxyalkoxysilyl end-blocked diorganopolysiloxane, (B) an alkoxysilane compound and/or a partial hydrolytic condensate thereof, (C) a curing catalyst, and (D) an organic compound having at least one fatty acid ester radical of formula (3). These components are described in detail.

Component (A) is the primary component of the composition. It is a diorganopolysiloxane blocked with hydroxylsilyl, alkoxysilyl or alkoxyalkoxysilyl radicals at both ends of the molecular chain. It should have a viscosity at 25° C. in the range of 20 to 1,000,000 mPa·s, preferably 100 to 100,000 mPa·s. Outside the range, too low a viscosity leads to a cured product having poor rubber elasticity whereas a too high a viscosity interferes with working. Note that the viscosity is measured by a rotational viscometer. The molecular structure of the organopolysiloxane is substantially linear although the molecular chain may be partially branched.

Specifically component (A) is a diorganopolysiloxane having the general formula (1).

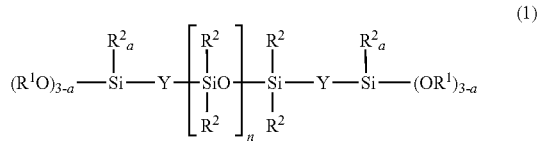

(1)

Herein $R^1$ is a radical selected from hydrogen; alkyl radicals of 1 to 10 carbon atoms such as methyl, ethyl, propyl, butyl and octyl; and alkoxyalkyl radicals of 2 to 10 carbon atoms such as methoxymethyl, methoxyethyl and ethoxymethyl. Of these, hydrogen, methyl and ethyl are preferred. $R^2$ is a radical of 1 to 10 carbon atoms selected from monovalent hydrocarbon, monovalent halogenated hydrocarbon, and cyanoalkyl radicals. Examples include alkyl radicals such as methyl, ethyl, propyl, butyl and octyl; cycloalkyl radicals such as cyclopentyl and cyclohexyl; alkenyl radicals such as vinyl and allyl; aryl radicals such as phenyl, tolyl and naphthyl; aralkyl radicals such as benzyl, phenylethyl and phenylpropyl; monovalent halogenated hydrocarbon radicals such as trifluoropropyl and chloropropyl; and cyanoalkyl radicals such as β-cyanoethyl and γ-cyanopropyl. Of these, methyl is preferred. When $R^1$ is an alkyl or alkoxyalkyl radical, a is 0 or 1. When $R^1$ is hydrogen, a is 2.

Y is oxygen, a divalent hydrocarbon radical of 1 to 6 carbon atoms, or a radial of the general formula (2).

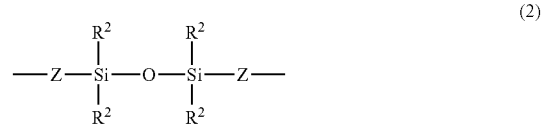

(2)

Herein $R^2$ is as defined above, and Z is a divalent hydrocarbon radical of 1 to 6 carbon atoms.

Preferred divalent hydrocarbon radicals include alkylene radicals of 1 to 6 carbon atoms such as methylene, ethylene, propylene, butylene, and hexylene, with ethylene being most preferred. The alkylene radical may have hydrogen substituted by a monovalent hydrocarbon radical such as methyl. The letter n is such a number that the diorganopolysiloxane may have a viscosity of 20 to 1,000,000 mPa·s at 25° C. Component (A) may be prepared by any well-known methods.

Component (B) is an alkoxysilane compound which plays the role of causing the organopolysiloxane composition to cure and controlling the cure rate in accordance with an amount thereof.

Examples of alkoxysilane (B) include alkoxy-containing compounds such as tetramethoxysilane, methyltrimethoxysilane, vinyltrimethoxysilane, phenyltrimethoxysilane, tetraethoxysilane, methyltriethoxysilane, vinyltriethoxysilane, phenyltriethoxysilane, tetrapropoxysilane, tetraisopropoxysilane, ethyltrimethoxysilane, propyltrimethoxysilane, isobutyltrimethoxysilane, n-butyltrimethoxysilane, n-hexyltrimethoxysilane, decyltrimethoxysilane and partial hydrolytic condensates thereof; substituted alkoxy-containing compounds such as tetrakis(2-ethoxyethoxy)silane, methyltris(2-methoxyethoxy)silane, vinyl(2-ethoxyethoxy)silane, phenyltris(2-methoxyethoxy)silane and partial hydrolytic condensates thereof; enoxy-containing compounds such as methyltriisopropenoxysilane, vinyltriisopropenoxysilane, phenyltriisopropenoxysilane, dimethyldiisopropenoxysilane, methylvinyldiisopropenoxysilane, and partial hydrolytic condensates thereof; bisalkoxysilyldisiloxane compounds such as 1,3-bis[(trimethoxysilyl)ethyl]-1,1,3,3-tetramethyldisiloxane, 1,3-bis[(triethoxysilyl)ethyl]-1,1,3,3-tetramethyldisiloxane, 1,3-bis[(methyldimethoxysilyl)ethyl]-1,1,3,3-tetramethyldisiloxane, 1-[(trimethoxysilyl)ethyl]-3-[(triethoxysilyl)ethyl]-1,1,3,3-tetramethyldisiloxane, and 1-[(methyldimethoxysilyl)ethyl]-3-[(trimethoxysilyl)ethyl]-1,1,3,3-tetramethyldisiloxane; and bisalkoxysilylalkane compounds such as 1,2-bis(trimethoxysilyl)ethane and 1,6-bis(trimethoxysilyl)hexane.

The alkoxysilanes may be used alone or in admixture of two or more. Of these, methyltrimethoxysilane, methyltriethoxysilane, ethyltrimethoxysilane, propyltrimethoxysilane, isobutyltrimethoxysilane, hexyltrimethoxysilane, decyltrimethoxysilane, vinyltrimethoxysilane and vinyltriethoxysilane are preferred because they are commercially available at relatively low costs. Methyltrimethoxysilane is most preferred.

The amount of component (B) added is 0.5 to 20 parts by weight per 100 parts by weight of component (A). When component (A) is of formula (1) wherein $R^1$ is hydrogen, the amount of component (B) added is preferably such that the moles of alkoxy radicals in component (B) may exceed the moles of hydroxyl radicals in component (A) because good curability and storage stability are obtainable.

Component (C) is a curing catalyst, examples of which include organic carboxylates, alkoxides and chelates of metals such as tin, titanium, zirconium, aluminum, iron, antimony, bismuth, and manganese. More specifically, examples include tin compounds such as dibutyltin dilaurate, dibutyltin dioctoate, dioctyltin dilaurate, dibutyltin maleate ester, dimethyltin dineodecanoate, dibutyltin dimethoxide, dioctyltin dineodecanoate and stannous octoate; organic aluminum compounds such as tris(acetylacetonato)aluminum, tris (ethylacetoacetate)aluminum, diisopropoxyaluminum ethylacetoacetate, and triethoxyaluminum; organic zirconium compounds such as tetrakis(acetylacetonato)zirconium, tetraisopropoxyzirconium, tetrabutoxyzirconium, tributoxyzirconium acetylacetonato, and tributoxyzirconium stearate; alkoxytitanium compounds such as tetra-n-butoxytitanium, tetrakis(2-ethylhexoxy)titanium, tetraisopropoxytitanium, and tetra-t-butoxytitanium; titanium chelate compounds such as diisopropoxybis(acetylacetonato)titanium, diisopropoxybis(ethylacetoacetate)titanium, and dibutoxybis(methylacetoacetate)titanium; and amine compounds such as dibutylamine, laurylamine, tetramethylguanidine, tetramethylguanidylpropyltrimethoxysilane, and salts thereof. These compounds may be used alone or in admixture. Inter alia, titanium compounds are preferably added because the composition is more improved in adhesion and storage stability. More preferred titanium compounds include titanium chelate and alkoxytitanium compounds. The catalyst is added in an amount of 0.001 to 20 parts by weight, preferably 1 to 10 parts by weight per 100 parts by weight of component (A).

Component (D) is an organic compound having in the molecule a number α of fatty acid ester radical of the general formula (3):

$$—OC(=O)CH_2R^3 \qquad (3)$$

wherein $R^3$ is hydrogen or a monovalent saturated or unsaturated hydrocarbon radical which may be straight or branched, and a number β of hydroxyl radical wherein α is a positive integer of at least 1, β is 0, 1 or 2, and α+β≥3. It is understood that α is the number of fatty acid ester radicals and β is the number of hydroxyl radicals. Component (D) is effective for dramatically ameliorating the storage stability of the organopolysiloxane composition. In this sense, the composition of the invention is characterized by component (D).

The organic compound as component (D) is not particularly limited as long as it has a number α of fatty acid ester radical of the general formula (3) and a number β of hydroxyl radical wherein α is a positive integer of at least 1, β is 0, 1 or 2, and they should meet α+β≥3. When those compounds wherein α+β<3, for example, fatty acid esters such as stearyl stearate, lauryl stearate, stearyl palmitate, lauryl palmitate, behenyl behenate, ethylene glycol distearate, ethylene glycol diacetate, propylene glycol diacetate and linalyl acetate are used as component (D), they cannot impart sufficient storage stability to the composition. Those compounds wherein α+β≥3 and +=0, for example, glycerol, trimethylolpropane, pentaerythritol, glucose, fructose and cellulose are not acceptable as component (D) because they do not provide the composition with sufficient self-adhesion ability, and they adversely affect the composition, typically increase the viscosity thereof. In formula (3), methylene (—CH$_2$—) must intervene between $R^3$ and —OC(=O)— moiety. When compounds in which hydrogen on —CH$_2$— is substituted by another organic radical, for example, glycerol tris(2-ethylhexanoate) and glycerol trisneodecanoate are used, they cannot impart sufficient storage stability to the composition. The value of α+β is not particularly limited as long as it is greater than or equal to 3. Preferably α+β is equal to 3, 4 or 5, more preferably equal to 3. The number α is not particularly limited as long as it is greater than or equal to 1. Preferably α is an integer from 1 to 5, more preferably from 1 to 3. The number β should be an integer selected from 0, 1 and 2. $R^3$ is hydrogen or a monovalent saturated or unsaturated hydrocarbon radical which may be straight or branched. Examples of $R^3$ include hydrogen or hydrocarbon radicals such as methyl, ethyl, heptadecyl, octadecyl, 2-ethylhexyl, vinyl, and allyl. A radical having a lower molecular weight is preferred as $R^3$ in order to achieve better effects with smaller amounts of addition. In this sense, $R^3$ is most preferably hydrogen.

Preferably component (D) used herein is a fatty acid ester of a polyol containing at least 3 hydroxyl radicals in the molecule, having a fatty acid ester radical of formula (3). More preferably it is a glycerol fatty acid ester having a fatty acid ester radical of formula (3).

Examples of component (D) include triacetin, diacetin, monoacetin, tributyrin, tricaprylin, tristearin, glycerol diacetate laurate, trimethylolpropane tristearate, trimethylolpropane triacetate, and pentaerythritol monoacetate. Of these, triacetin, diacetin and monoacetin are preferred because better effects are obtainable with smaller amounts of addition. Most preferred is triacetin.

The amount of component (D) added is 0.1 to 5 parts by weight, and preferably 0.5 to 2.5 parts by weight per 100 parts by weight of component (A). Less than 0.1 pbw of component (D) fails to impart sufficient storage stability to the composition, whereas greater than 5 pbw of component (D) significantly detracts from the self-adhesion ability of the composition.

In addition to components (A) to (D), preferably the composition may further comprise (E) calcium carbonate. Component (E) functions to further improve the depth curability of the composition and impart better mechanical properties to the cured composition.

Examples of component (E) include heavy (or grounded) calcium carbonate and precipitated calcium carbonate, which are optionally surface treated with organic acids such as fatty acids or resin acids, organic acid alkali metal salts or organic acid esters. It is not important whether calcium carbonate is surface treated, nor the type of treating agent. Precipitated calcium carbonate and heavy calcium carbonate may be used either individually or in admixture, depending on the desired properties of the composition. The BET specific surface area of component (E) is not particularly limited. Preferably the precipitated calcium carbonate surface-treated with organics has a specific surface area in the range of 5 to 50 m$^2$/g, and more preferably 10 to 40 m$^2$/g. Also preferably the untreated precipitated calcium carbonate, which takes the form of spindle-shaped primary particles resulting from agglomeration during preparation, has a specific surface area in the range of 1 to 20 m²/g, and more preferably 3 to 10 m²/g. The heavy calcium carbonate should preferably have a specific surface area in the range of 1 to 15 m²/g, independent of whether or not it has been surface treated with organics.

The amount of component (E) added is in a range of 10 to 300 parts by weight, preferably 30 to 200 parts by weight per 100 parts by weight of component (A). When the amount of component (E) is less than the range, the desired properties may not be improved. When the amount of component (E) is greater than the range, the composition may become awkward to handle or work.

In addition to components (A) to (E), preferably (F) a silane coupling agent is compounded in the composition for further enhancing the adhesion of the composition to various substrates.

Any well-known silane coupling agents may be used as component (F). Silane coupling agents having an alkoxysilyl or alkenoxysilyl radical as a hydrolyzable radical are especially preferred. Examples include vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, γ-aminopropyltriethoxysilane, 3-(N-aminomethylbenzylamino)propyltrimethoxysilane, N,N'-bis[3-(trimethoxysilyl)propyl]ethylenediamine, N,N-bis[3-(trimethoxysilyl)propyl]amine, γ-mercaptopropyltrimethoxysilane, γ-glycidoxypropyltriisopropenoxysilane, γ-glycidoxypropylmethyldiisopropenoxysilane, the reaction product of (meth)acrylsilane with aminosilane, the reaction product of epoxysilane with aminosilane, and the reaction product of aminosilane with haloalkyl-containing silane. Those silane coupling agents having at least one amino in the molecule are preferably used.

The amount of the silane coupling agent added is in a range of 0.1 to 20 parts by weight, preferably 0.5 to 10 parts by weight per 100 parts by weight of component (A). Less than 0.1 pbw of the agent may not impart sufficient adhesion, whereas greater than 20 pbw of the agent may be uneconomical and detract from adhesion in hot water.

In addition to the aforementioned components, any well-known additives may be compounded in the composition as long as this does not compromise the benefits of the invention. Examples of the additive include fine powder inorganic fillers such as dry silica, wet silica, finely divided quartz, titanium dioxide powder, diatomaceous earth powder, aluminum hydroxide powder, finely divided alumina, magnesia powder, and zinc oxide powder, which are optionally surface treated with silanes, silazanes, and siloxane oligomers. The amount of inorganic filler added is in a range of 10 to 200 parts by weight, preferably 30 to 150 parts by weight per 100 parts by weight of component (A). Exemplary other additives include agents for endowing the cured silicone rubber with a low modulus, for example, dialkoxysilanes such as diphenyldimethoxysilane and dimethyldimethoxysilane, trimethylsiloxy end-blocked dimethylpolysiloxane, and isoparaffin, flame retardants such as platinum compounds and zinc carbonate powder, optionally, thixotropic agents such as polyether, colorants such as pigments, dyes and fluorescent brighteners, heat resistance enhancers such as red iron oxide and cerium oxide, freeze resistance enhancers, rust preventives, mildew-proofing agents and anti-fungus agents. Solvents may also be added, such as toluene, xylene, gasoline, cyclohexane, methylcyclohexane, and low-boiling isoparaffin.

The composition may be prepared in one-pack form by combining the above described components (A) to (D) and optional components in a dry atmosphere in accordance with standard methods. The thus prepared composition is then preferably stored in a hermetically sealed package. When the composition is allowed to stand in the ambient atmosphere, it cures due to the presence of airborne moisture. While the composition finds use in a variety of applications, it is particularly useful as sealants and adhesives.

EXAMPLE

Examples of the invention are given below by way of illustration and not by way of limitation. In Examples, all parts are by weight. The viscosity is measured at 25° C. The compositions were prepared using a mixing equipment 5DMV-01-r (Dalton Co., Ltd.).

Example 1

An organopolysiloxane composition was prepared by intimately mixing 100 parts of α,ω-bis(trimethoxysiloxy)-polydimethylsiloxane having a viscosity of 50 Pa·s with 45 parts of α,ω-bis(trimethylsiloxy)polydimethylsiloxane having a viscosity of 100 mPa·s, 130 parts of precipitated calcium carbonate surface-treated with fatty acid (Carlex 300, Maruo Calcium Co., Ltd.), 45 parts of untreated precipitated calcium carbonate (Silver-W, Shiraishi Calcium Kaisha, Ltd.), and 1.5 parts of stearic acid (Powder Stearic Acid 300, New Japan Chemical Co., Ltd.). Then 9 parts of methyltrimethoxysilane, 1 part of 3-glycidoxypropyltrimethoxysilane, 1 part of triacetin (α=3, β=0), and 6 parts of diisopropoxybis(ethyl-acetoacetate)titanium were added to the mixture. The contents were mixed in a moisture-proof environment until uniform.

Example 2

An organopolysiloxane composition was prepared by the same procedure as in Example 1 except that 1 part of tributyrin (α=3, β=0) was used instead of 1 part of triacetin.

Example 3

An organopolysiloxane composition was prepared by the same procedure as in Example 1 except that 1 part of tricaprylin (α=3, β=0) was used instead of 1 part of triacetin.

Comparative Example 1

An organopolysiloxane composition was prepared by the same procedure as in Example 1 except that 1 part of triacetin was omitted.

Comparative Example 2

An organopolysiloxane composition was prepared by the same procedure as in Example 1 except that 1 part of glycerol tris(2-ethylhexanoate) was used instead of 1 part of triacetin.

Comparative Example 3

An organopolysiloxane composition was prepared by the same procedure as in Example 1 except that 3 parts of glycerol tris(2-ethylhexanoate) was used instead of 1 part of triacetin.

Example 4

An organopolysiloxane composition was prepared by the same procedure as in Example 1 except that 4 parts of diisopropoxybis(ethylacetoacetate)titanium and 1.5 parts of tetraisopropoxytitanium were used instead of 6 parts of diisopropoxybis(ethylacetoacetate)titanium.

Example 5

An organopolysiloxane composition was prepared by intimately mixing 100 parts of α,ω-bis(trimethoxysiloxy)-polydimethylsiloxane having a viscosity of 50 Pa·s with 70 parts of α,ω-bis(trimethylsiloxy)polydimethylsiloxane having a viscosity of 100 mPa·s, 130 parts of precipitated calcium carbonate surface-treated with fatty acid (Carlex 300, Maruo Calcium Co., Ltd.), and 35 parts of untreated precipitated calcium carbonate (Silver-W, Shiraishi Calcium Kaisha, Ltd.). Then 10 parts of methyltrimethoxysilane, 2 parts of triacetin, and 8 parts of diisopropoxybis(ethylacetoacetate) titanium were added to the mixture. The contents were mixed in a moisture-proof environment until uniform.

Example 6

An organopolysiloxane composition was prepared by the same procedure as in Example 5 except that 2 parts of diacetin ($\alpha=2$, $\beta=1$) was used instead of 2 parts of triacetin.

Example 7

An organopolysiloxane composition was prepared by the same procedure as in Example 5 except that 2 parts of monoacetin ($\alpha=1$, $\beta=2$) was used instead of 2 parts of triacetin.

Comparative Example 4

An organopolysiloxane composition was prepared by the same procedure as in Example 5 except that 2 parts of propylene glycol diacetate ($\alpha=2$, $\beta=0$) was used instead of 2 parts of triacetin.

Comparative Example 5

An organopolysiloxane composition was prepared by the same procedure as in Example 5 except that 2 parts of ethylene glycol diacetate ($\alpha=2$, $\beta=0$) was used instead of 2 parts of triacetin.

Comparative Example 6

An organopolysiloxane composition was prepared by the same procedure as in Example 5 except that 2 parts of ethylene glycol ($\alpha=0$, $\beta=2$) was used instead of 2 parts of triacetin.

Comparative Example 7

An organopolysiloxane composition was prepared by the same procedure as in Example 5 except that 2 parts of linalyl acetate ($\alpha=1$, $\beta=0$) was used instead of 2 parts of triacetin.

Comparative Example 8

An organopolysiloxane composition was prepared by the same procedure as in Example 5 except that 2 parts of glycerol ($\alpha=0$, $\beta=3$) was used instead of 2 parts of triacetin.

Example 8

An organopolysiloxane composition was prepared by the same procedure as in Example 5 except that 100 part of α,ω-dihydroxypolydimethylsiloxane was used instead of 100 parts of α,ω-bis(trimethoxysiloxy)polydimethylsiloxane having a viscosity of 50 Pa·s and the amount of triacetin was changed from 2 parts to 1 part.

Example 9

An organopolysiloxane composition was prepared by intimately mixing 100 parts of α,ω-bis(trimethoxysilylethyl)-polydimethylsiloxane having a viscosity of 30 Pa·s with 70 parts of α,ω-bis(trimethylsiloxy)polydimethylsiloxane having a viscosity of 100 mPa·s, 165 parts of precipitated calcium carbonate surface-treated with fatty acid (Carlex 300, Maruo Calcium Co., Ltd.), and 35 parts of untreated precipitated calcium carbonate (Silver-W, Shiraishi Calcium Kaisha, Ltd.). Then 10 parts of methyltrimethoxysilane, 1 part of triacetin, 1.5 parts of 3-glycidoxypropyltrimethoxysilane, 3.5 parts of diisopropoxybis(ethylacetoacetate)titanium, and 1.5 parts of tetraisopropoxytitanium were added to the mixture. The contents were mixed in a moisture-proof environment until uniform.

Example 10

An organopolysiloxane composition was prepared by intimately mixing 100 parts of α,ω-bis(trimethoxysiloxy)-polydimethylsiloxane having a viscosity of 50 Pa·s with 65 parts of α,ω-bis(trimethylsiloxy)polydimethylsiloxane having a viscosity of 100 mPa·s, 17 parts of fumed silica hydrophobized with dimetyldichlorosilane (Aerosil R972, Nippon Aerosil Co., Ltd.), 183 parts of untreated heavy calcium carbonate (Whiton SSB, Shiraishi Calcium Kaisha, Ltd.), and 1.7 parts of stearic acid (Powder Stearic Acid 300, New Japan Chemical Co., Ltd.). Then 10 parts of methyltrimethoxysilane, 1.7 parts of 3-glycidoxypropyltrimethoxysilane, 0.8 part of triacetin, and 5 parts of diisopropoxybis(ethylacetoacetate)-titanium were added to the mixture. The contents were mixed in a moisture-proof environment until uniform.

The organopolysiloxane compositions prepared in Examples and Comparative Examples were evaluated for physical properties, adhesion, and storage stability. Evaluation was conducted by the following methods. The test results of the compositions in Examples and Comparative Examples are shown in Tables 1 and 2, respectively.

Physical Properties

The composition was extruded on a polyethylene frame and held at 23° C. and RH 50% for 7 days, whereby it cured into a sheet of 2 mm thick. The sheet was measured for physical properties (hardness, elongation at break and tensile strength) according to JIS K-6249.

Adhesion

The composition was evaluated for adhesion according to the simplified adhesion test method in "Japanese Architectural Standard Specification (JASS) 8 Waterproofing and Sealing". It is applied to three types of substrates including float glass, anodized aluminum, and fluoropolymer-coated aluminum, i.e., an aluminum substrate coated with Duflon K500 (Nippon Paint Co., Ltd.), which belongs to the class of high-temperature baking fluoropolymer coating that is generally regarded difficult to overcoat. The ratings of the adhesion test are represented by symbol "○" for good adhesion due to cohesive failure or thin-layer cohesive failure, "Δ" for fair adhesion due to partial interfacial peeling, and "X" for poor adhesion due to interfacial peeling. Note that no primers were used.

Storage Stability

A polyethylene sealant cartridge (volume 330 ml) was charged with the composition and hermetically sealed with an inner plug. The cartridge was stored in a dryer at 70° C. for 7 days, after which it was taken out of the dryer and allowed to stand at 23° C. and RH 50% for one day. The composition after hot storage was similarly evaluated for physical properties.

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Physical Properties | Hardness, Type A | 35 | 34 | 35 | 35 | 34 | 33 | 37 | 27 | 39 | 28 |
|  | Elongation at break, % | 700 | 660 | 640 | 680 | 520 | 490 | 480 | 500 | 480 | 610 |
|  | Tensile strength, MPa | 2.0 | 1.9 | 1.9 | 1.9 | 1.8 | 1.7 | 1.8 | 1.6 | 2.1 | 1.6 |
| Adhesion | Float glass | ○ | ○ | ○ | ○ | ○ | ○ | ○ | ○ | ○ | ○ |
|  | Anodized aluminum | ○ | ○ | ○ | ○ | ○ | ○ | ○ | ○ | ○ | ○ |
|  | Fluoropolymer-coated aluminum | ○ | ○ | Δ | ○ | ○ | ○ | ○ | ○ | ○ | Δ |
| Storage Stability | Hardness, Type A | 33 | 29 | 27 | 29 | 27 | 30 | 30 | 24 | 36 | 28 |
|  | Elongation at break, % | 700 | 700 | 660 | 670 | 530 | 500 | 480 | 580 | 530 | 650 |
|  | Tensile strength, MPa | 1.8 | 1.5 | 1.4 | 1.5 | 1.6 | 1.6 | 1.5 | 1.4 | 2.1 | 1.7 |

TABLE 2

|  |  | Comparative Example | | | | | | | |
|---|---|---|---|---|---|---|---|---|---|
|  |  | 1 | 2 | 3 | 4 | 5 | 6 | 7 | 8 |
| Physical Properties | Hardness, Type A | 36 | 35 | 35 | 35 | 34 | 35 | 34 | 36 |
|  | Elongation at break, % | 620 | 650 | 640 | 450 | 450 | 440 | 440 | 460 |
|  | Tensile strength, MPa | 2.0 | 1.9 | 1.9 | 1.8 | 1.9 | 1.8 | 1.8 | 2.0 |
| Adhesion | Float Glass | ○ | ○ | ○ | ○ | ○ | ○ | ○ | ○ |
|  | Anodized aluminum | ○ | ○ | ○ | ○ | ○ | ○ | ○ | Δ |
|  | Fluoropolymer-coated aluminum | Δ | X | X | ○ | ○ | ○ | ○ | X |
| Storage Stability | Hardness, Type A | 14 | 15 | 13 | 16 | 17 | 18 | 16 | 30 |
|  | Elongation at break, % | 470 | 440 | 500 | 480 | 540 | 570 | 440 | 450 |
|  | Tensile strength, MPa | 0.5 | 0.4 | 0.5 | 0.5 | 0.8 | 0.9 | 0.7 | 1.5 |

As seen from Tables 1 and 2, the organopolysiloxane compositions in Examples 1 to 10 display excellent adhesion without a need for primers and improved storage stability even after a certain period of high-temperature holding. Thus, the compositions are useful as waterproof sealants for civil engineering and construction, and elastomeric adhesives and coating materials in the electrical and electronic industry.

Japanese Patent Application No. 2008-300705 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature curable organopolysiloxane composition, comprising:
(A) 100 parts by weight of a diorganopolysiloxane blocked with hydroxylsilyl, alkoxysilyl or alkoxyalkoxysilyl radicals at both ends of the molecular chain and represented by formula (1), said diorganopolysiloxane having a viscosity of 20 to 1,000,000 mPa·s at 25° C.,

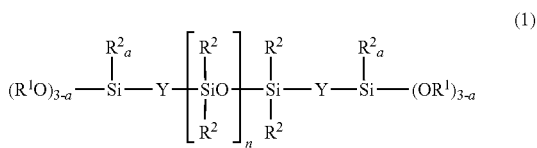

wherein $R^1$ is hydrogen, an alkyl radical of 1 to 10 carbon atoms, or an alkoxyalkyl radical of 2 to 10 carbon atoms, $R^2$ is a radical of 1 to 10 carbon atoms selected from the group consisting of a monovalent hydrocarbon, a monovalent halogenated hydrocarbon, and a cyanoalkyl radical, a is 2 when $R^1$ is hydrogen, a is 0 or 1 when $R^1$ is an alkyl or alkoxyalkyl radical, Y is oxygen, a divalent hydrocarbon radical of 1 to 6 carbon atoms, or a radical of formula (2):

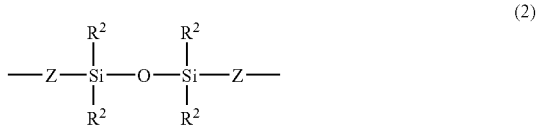

wherein $R^2$ is as defined above, and Z is a divalent hydrocarbon radical of 1 to 6 carbon atoms, and n is such a number that the diorganopolysiloxane has a viscosity of 20 to 1,000,000 mPa·s at 25° C.;
(B) 0.5 to 20 parts by weight of an alkoxysilane compound, a partial hydrolytic condensate thereof, or both;
(C) 0.001 to 20 parts by weight of a curing catalyst;
(D) 0.1 to 5 parts by weight of triacetin; and
(E) 10 to 300 parts by weight of calcium carbonate.

2. The composition of claim 1, wherein component (C) is a titanium compound.

3. The composition of claim 1, further comprising:
(F) 0.1 to 20 parts by weight of a silane coupling agent per 100 parts by weight of component (A).

4. The composition of claim 1, wherein component (B) comprises at least one member selected from the group consisting of tetramethoxysilane, a partial hydrolytic condensate of tetramethoxysilane, ethyltrimethoxysilane, a partial hydrolytic condensate of ethyltrimethoxysilane, vinyltrimethoxysilane, a partial hydrolytic condensate of vinyltrimethoxysilane, phenyltrimethoxysilane, a partial hydrolytic condensate of phenyltrimethoxysilane, tetraethoxysilane, a partial hydrolytic condensate of tetraethoxysilane, methyltriethoxysilane, a partial hydrolytic condensate of methyltriethoxysilane, vinyltriethoxysilane, a partial hydrolytic condensate of vinyltriethoxysilane, phenyltriethoxysilane, a partial hydrolytic condensate of phenyltriethoxysilane, tetrapropoxysilane, a partial hydrolytic condensate of tetrapropoxysilane, tetraisopropoxysilane, a partial hydrolytic condensate of tetraisopropoxysilane, ethyltrimethoxysilane, a partial hydrolytic condensate of ethyltrimethoxysilane, propyltrimethoxysilane, a partial hydrolytic condensate of propyltrimethoxysilane, isobutyltrimethoxysilane, a partial hydrolytic condensate of isobutyltrimethoxysilane, n-butyltrimethoxysilane, a partial hydrolytic condensate of n-butyltrimethoxysilane, n-hexyltrimethoxysilane, a partial hydrolytic condensate of n-hexyltrimethoxysilane, decyltrimethoxysilane, a partial hydrolytic condensate of decyltrimethoxysilane, tetrakis(2-ethoxyethoxy)silane, methyltris(2-methoxyethoxy)silane, a partial hydrolytic condensate of methyltris(2-methoxyethoxy)silane, vinyl(2-ethoxyethoxy)silane, a partial hydrolytic condensate of vinyl (2-ethoxyethoxy)silane, phenyltris(2-methoxyethoxy)silane, a partial hydrolytic condensate of phenyltris(2-methoxyethoxy)silane, methyltriisopropenoxysilane, a partial hydrolytic condensate of methyltriisopropenoxysilane, vinyltriisopropenoxysilane, a partial hydrolytic condensate of vinyltriisopropenoxysilane, phenyltriisopropenoxysilane, a partial hydrolytic condensate of phenyltriisopropenoxysilane, dimethyldiisopropenoxysilane, a partial hydrolytic condensate of dimethyldiisopropenoxysilane, methylvinyldiisopropenoxysilane, a partial hydrolytic condensate of methylvinyldiisopropenoxysilane, 1,3-bis[(trimethoxysilyl)ethyl]-1,1,3,3-tetramethyldisiloxane, 1,3-bis[(triethoxysilyl)ethyl]-1,1,3,3-tetramethyldisiloxane, 1,3-bis[(methyldimethoxysilyl)ethyl]-1,1,3,3-tetramethyldisiloxane, 1-[(trimethoxysilyl)ethyl]-3-[(triethoxysilyl)ethyl]-1,1,3,3-tetramethyldisiloxane, 1-[(methyldimethoxysilyl)ethyl]-3-[(trimethoxysilyl)ethyl]-1,1,3,3-tetramethyldisiloxane, 1,2-bis(trimethoxysilyl)ethane and 1,6-bis(trimethoxysilyl)hexane.

5. The composition of claim 1, wherein component (B) comprises at least one member selected from the group consisting of methyltrimethoxysilane, methyltriethoxysilane, ethyltrimethoxysilane, propyltrimethoxysilane, isobutyltrimethoxysilane, hexyltrimethoxysilane, decyltrimethoxysilane, vinyltrimethoxysilane and vinyltriethoxysilane.

6. The composition of claim 1, wherein component (C) is present in the composition in an amount of from 1 to 10 parts by weight per 100 parts by weight of component (A).

7. The composition of claim 1, wherein component (C) comprises at least one carboxylate, alkoxide or a chelate of a metal selected from the group consisting of tin, titanium, zirconium, aluminum, iron, antimony, bismuth, and manganese.

8. The composition of claim 1, wherein component (C) comprises at least one member selected from the group consisting of dibutyltin dilaurate, dibutyltin dioctoate, dioctyltin dilaurate, dibutyltin maleate ester, dimethyltin dineodecanoate, dibutyltin dimethoxide, dioctyltin dineodecanoate, stannous octoate, tris(acetylacetonato)aluminum, tris(ethylacetoacetate)aluminum, diisopropoxyaluminum ethylacetoacetate, triethoxyaluminum, tetrakis(acetylacetonato)zirconium, tetraisopropoxyzirconium, tetrabutoxyzirconium, tributoxyzirconium acetylacetonato, tributoxyzirconium stearate, tetra-n-butoxytitanium, tetrakis(2-ethylhexoxy)titanium, tetraisopropoxytitanium, and tetra-t-butoxytitanium, iisopropoxybis(acetylacetonato)titanium, diisopropoxybis(ethylacetoacetate)titanium, dibutoxybis(methylacetoacetate)titanium, dibutylamine, laurylamine, tetramethylguanidine, etramethylguanidylpropyltrimethoxysilane, and a salt thereof.

9. The composition of claim 1, wherein component (C) comprises at least one member selected from the group consisting of a titanium chelate compound and an alkoxytitanium compound.

10. The composition of claim 1, wherein component (D) is present in an amount of from 0.5 to 2.5 parts by weight.

11. The composition of claim 1, further comprising:
(E) 30 to 200 parts by weight of calcium carbonate having a surface thereof treated with an organic acid and a BET specific surface area of from 5 to 50 m$^2$/g, per 100 parts by weight of component (A).

12. A room temperature curable organopolysiloxane composition comprising:
(A) 100 parts by weight of a diorganopolysiloxane blocked with hydroxylsilyl, alkoxysilyl or alkoxyalkoxysilyl radicals at both ends of the molecular chain and represented by formula (1), said diorganopolysiloxane having a viscosity of 20 to 1,000,000 mPa·s at 25° C.,

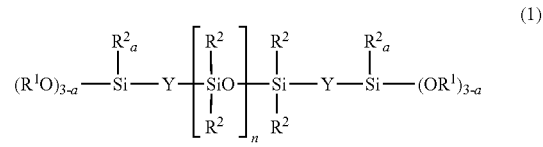

wherein R$^1$ is hydrogen, an alkyl radical of 1 to 10 carbon atoms, or an alkoxyalkyl radical of 2 to 10 carbon atoms, R$^2$ is a radical of 1 to 10 carbon atoms selected from the group consisting of a monovalent hydrocarbon, a monovalent halogenated hydrocarbon, and a cyanoalkyl radical, a is 2 when R$^1$ is hydrogen, a is 0 or 1 when R$^1$ is an alkyl or alkoxyalkyl radical, Y is oxygen, a divalent hydrocarbon radical of 1 to 6 carbon atoms or a radical of formula (2):

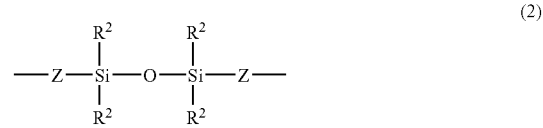

wherein R$^2$ is as defined above, and Z is a divalent hydrocarbon radical of 1 to 6 carbon atoms, and n is such a number that the diorganopolysiloxane has a viscosity of 20 to 1,000,000 mPa·s at 25° C.;

(B) 0.5 to 20 parts by weight of an alkoxysilane compound, a partial hydrolytic condensate thereof, or both;
(C) 0.001 to 20 parts by weight of a curing catalyst;
(D) 0.1 to 5 parts by weight of an organic compound selected from the group consisting of triacetin, diacetin, monoacetin, and mixtures thereof; and
(E) 30 to 200 parts by weight of untreated precipitated calcium carbonate having a BET specific surface area of from 1 to 20 m$^2$/g, per 100 parts by weight of component (A).

13. The composition of claim 1, further comprising:
(F) 0.5 to 10 parts by weight of a silane coupling agent per 100 parts by weight of component (A).

14. The composition of claim 1, further comprising:
(F) 0.5 to 10 parts by weight of at least one silane coupling agent selected from the group consisting of N-β-(aminoethyl)-γ-aminopropyltrimethoxysilane, γ-aminopropyltriethoxysilane, 3-(N-aminomethylbenzylamino)propyltrimethoxysilane, N,N'-bis[3-(trimethoxysilyl)propyl]ethylenediamine, and N,N-bis[3-trimethoxysilyl)propyl]amine.

15. The composition of claim 1, wherein component (A) is a mixture of i) an α,ω-bis(trimethoxysiloxy)polydimethylsiloxane and ii) an α,ω-bis(trimethylsiloxy)polydimethylsiloxane.

16. The composition of claim 1, wherein component (A) is a mixture of an i) α,ω-bis(trimethoxysiloxy)polydimethylsiloxane and ii) an α,ω-bis(trimethysiloxy)polydimethylsiloxane, said i) α,ω-bis(trimethoxysiloxy)-polydimethylsiloxane having a viscosity that is less than the viscosity of said ii) α,ωbis(trimethysiloxy)polydimethylsiloxane.

17. The composition of claim 1, which, after first being stored in a dryer at 70° C. for 7 days and thereafter stored out of the dryer at 23° C. for one day, has a Type A hardness of from 24 to 36, an elongation at break percentage of from 530% to 700%, and a tensile strength of from 1.4 to 2.1 MPa.

18. The composition of claim 12, which, after first being stored in a dryer at 70° C. for 7 days and thereafter stored out of the dryer at 23° C. for one day, has a Type A hardness of from 24 to 36, an elongation at break percentage of from 480% to 700%, and a tensile strength of from 1.4 to 2.1 MPa.

* * * * *